March 21, 1961 R. L. WURGAFT 2,975,810
CITRUS FRUIT JUICER
Filed Aug. 19, 1957 4 Sheets-Sheet 1

INVENTOR.
ROBERT L. WURGAFT
BY
ATTORNEYS

March 21, 1961 R. L. WURGAFT 2,975,810
CITRUS FRUIT JUICER
Filed Aug. 19, 1957 4 Sheets-Sheet 3

INVENTOR.
ROBERT L. WURGAFT
BY
ATTORNEYS

March 21, 1961 R. L. WURGAFT 2,975,810
CITRUS FRUIT JUICER
Filed Aug. 19, 1957 4 Sheets-Sheet 4
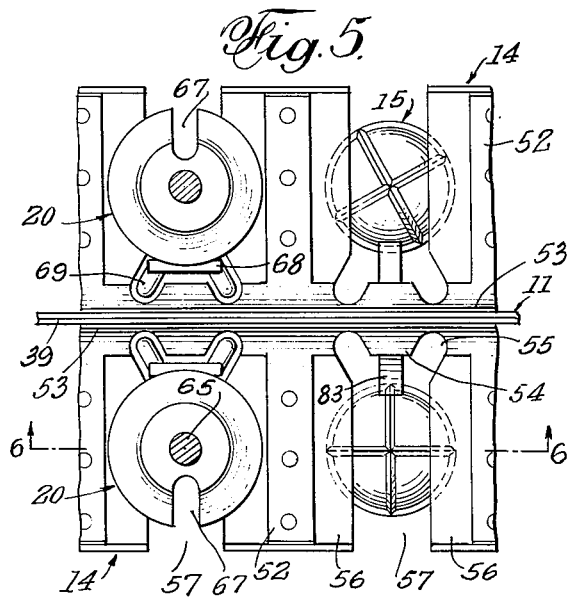
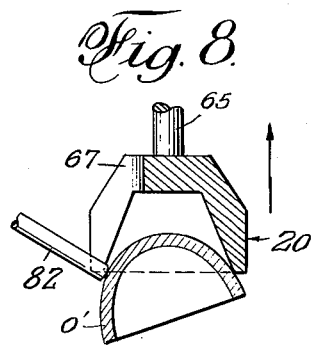
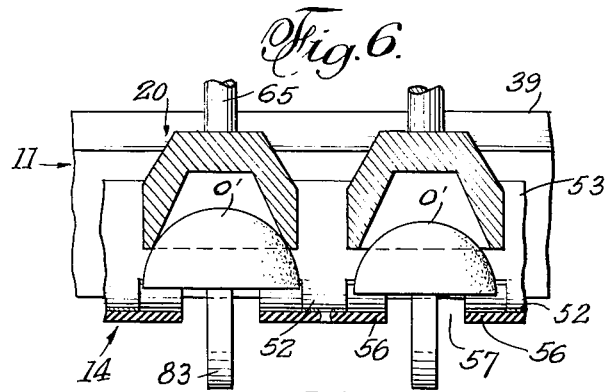
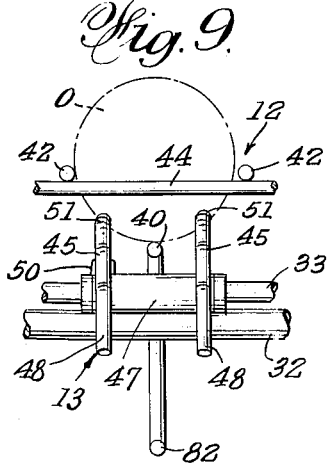
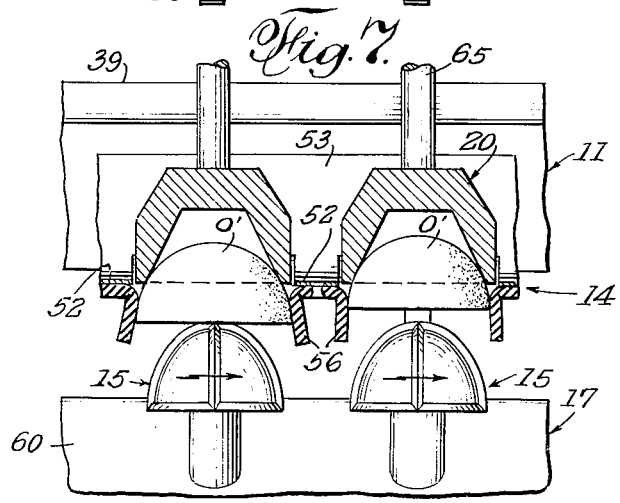
INVENTOR.
ROBERT L. WURGAFT
BY Lyon & Lyon
ATTORNEYS

United States Patent Office 2,975,810
Patented Mar. 21, 1961

2,975,810

CITRUS FRUIT JUICER

Robert L. Wurgaft, Anaheim, Calif., assignor to
Bruce Alexander, San Marino, Calif.

Filed Aug. 19, 1957, Ser. No. 678,994

14 Claims. (Cl. 146—3)

This invention relates to an automatic machine for juicing citrus fruits, and it is an object of this invention to provide novel, improved and rapidly-operating means for dividing the fruit into halves, reaming the halves to extract the juice therefrom, and finally directing the juice to collecting or conveying means and simultaneously discarding or expelling the peels or skins of the fruit.

While the present machine may be designed to efficiently handle oranges, grapefruit, and other citrus fruits, the same will be described as juicing oranges as typical of the fruit handled.

Because the orange skins or peels contain certain bitter acids and ingredients, juicing by first cutting the oranges into halves and then reaming out the pulp and juice without unduly disturbing the skins is desirable, and the present machine contemplates such procedure. The present machine is an improvement over prior machines that cut the oranges in half and ream the halves, in that the same is relatively simpler than prior machines, is adapted to operate continuously and with minimum loss of operating efficiency, is adapted for easy access to replace, repair and/or clean, is rapid in operation with resultant high production, and can handle oranges varying considerably in size and yet operate with maximum efficiency.

The last-mentioned attribute of the present machine has considerable importance because prior reaming type juicers required grading of the oranges within certain size limits, otherwise unduly large oranges or unduly small ones would frequently fail of proper handling, and fouling of the machine would result. The economy of feeding oranges without first grading for size will be apparent.

Another object of the invention is to provide an orange juicer that, in a simple manner, simultaneously directs a plurality of oranges to an aligned position above the cutting edge of a fixed blade, and then, by a continuous push on the oranges in a direction toward and past said cutting edge, first cuts all of the oranges into halves, then feeds said halves to two rows of continuously rotating reamers, and finally presses the orange halves onto the reamers to effect juicing as contemplated.

A further object of the invention is to clear the reamers for oncoming orange halves by means operative upon the reverse or recovery movement of the means that pushes on the oranges.

A still further object of the invention is to provide simple and improved means for locating oranges in central alignment above the cutting edge of the halving blade, the same being effective regardless of differences in the sizes of oranges that comprise the line or row ready to be fed for cutting by the blade.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 5 is a plan view of the means shown in Fig. 4, the same including orange-half feeding members not shown in said Fig. 4.

Fig. 6 is a sectional view, as taken on the line 6—6 of Fig. 5 and showing two feeding members in the process of engaging orange halves differing in size.

Fig. 7 is a similar view showing the next stage of the operation and prior to full engagement of the orange halves with the reamers toward which they are being directed.

Fig. 8 is a fragmentary vertical sectional view showing the manner of ejecting an orange peel that comes away from its reamer with the feeding member.

Fig. 9 is an end view, from the blade side, of orange-feeding means used in the present machine.

Fig. 10 is a fragmentary view of the modified form of this invention.

Figure 1:
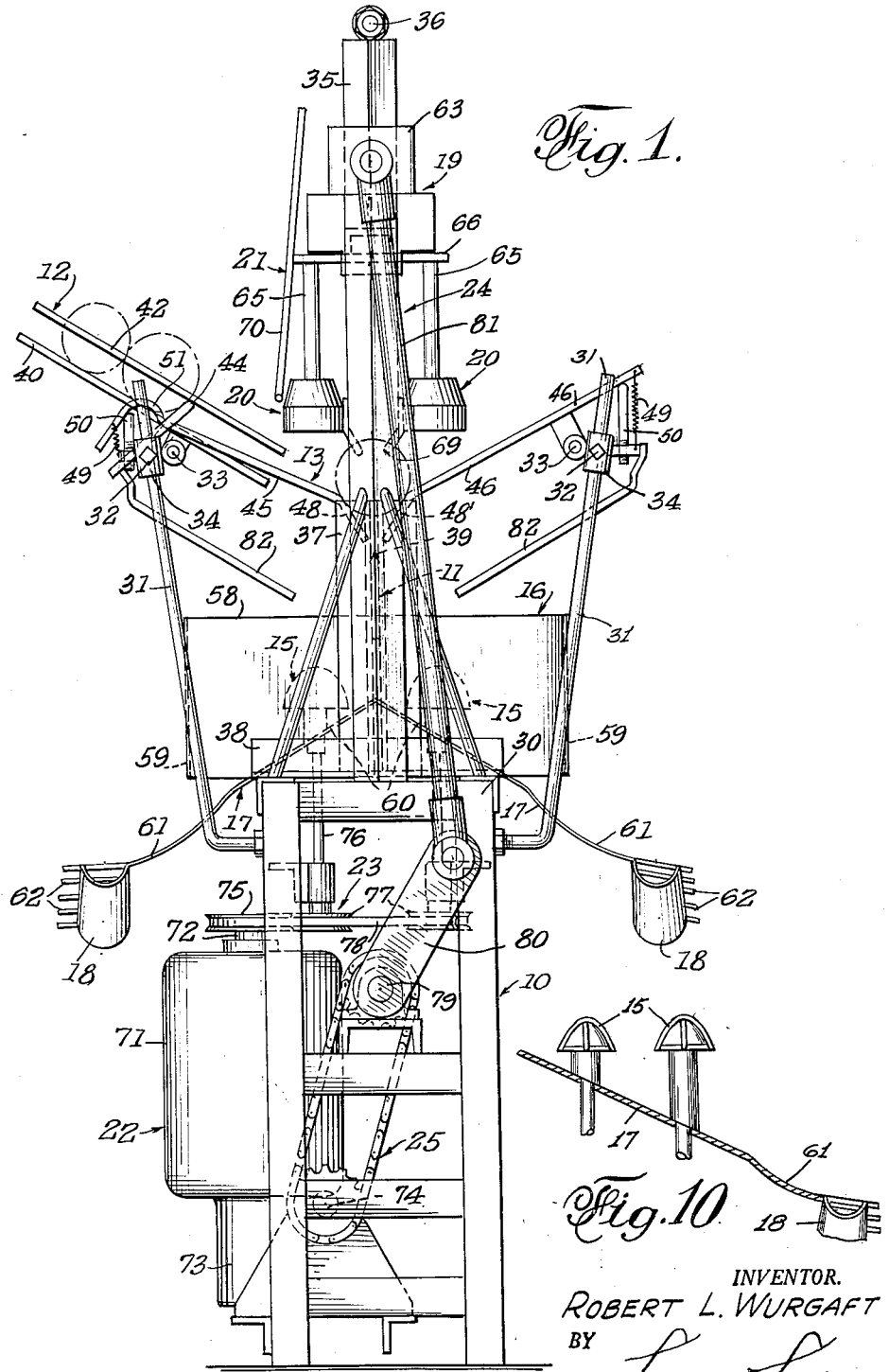
Fig. 1 is an end elevational view of an orange juicer according to the present invention.

The citrus fruit juicer that is illustrated comprises, generally, a frame 10, a fixed blade 11 carried centrally by said frame, a plurality of side-by-side orange-feed guides 12 carried by one side of said frame and disposed to direct oranges successively toward and above said blade, resilient means 13 on opposite sides of the frame and aligned with each feed guide 12 to locate such fed oranges in aligned position above the blade, orange-half-receiving means 14 carried by the blade 11 on each side thereof, two rows of reamers 15 beneath each of the means 14, a housing 16 enclosing the reamers, a juice-draining pan 17 beneath the reamers and terminating at the side in juice traps 18, a cross head 19 guided by the frame 10 for reciprocative movement toward and from the blade 11, two rows of orange-half-engaging cups 20 carried by the cross head, each aligned with a reamer and with one of the resilient means 13, orange-intercepting means 21 carried by the cross head and aligned with each feed guide 12, a prime mover 22 carried by the frame, a high-speed drive 23 between said primer mover and the reamers 15, means 24 to reciprocate the cross head 19, and a slow-speed drive 25 between the prime mover and the means 24.

The frame 10 may be variously formed. Essentially, the same comprises a support 30 of table-like form and the same may include side brackets 31, one on each side, the brackets on each side being connected by longitudinal members 32 and 33 that span between sleeves 34 the members 32 and 33 being adjustably carried by said brackets 31.

The frame 10 also includes a pair of centrally aligned vertical guides 35 disposed at opposite ends of the frame and extending upwardly from the support 30. The upper ends of said guides 35 are shown as connected by a tie rod 36 to stabilize the guides.

The blade 11 extends longitudinally between the guides 35 and is disposed between support 30 and tie rod 36, and is fixedly held in place by and between two pairs of angle members 37 at opposite ends of the frame and secured in vertical disposition to transverse angle members 38 that are fastened to the support 30.

Figure 3:
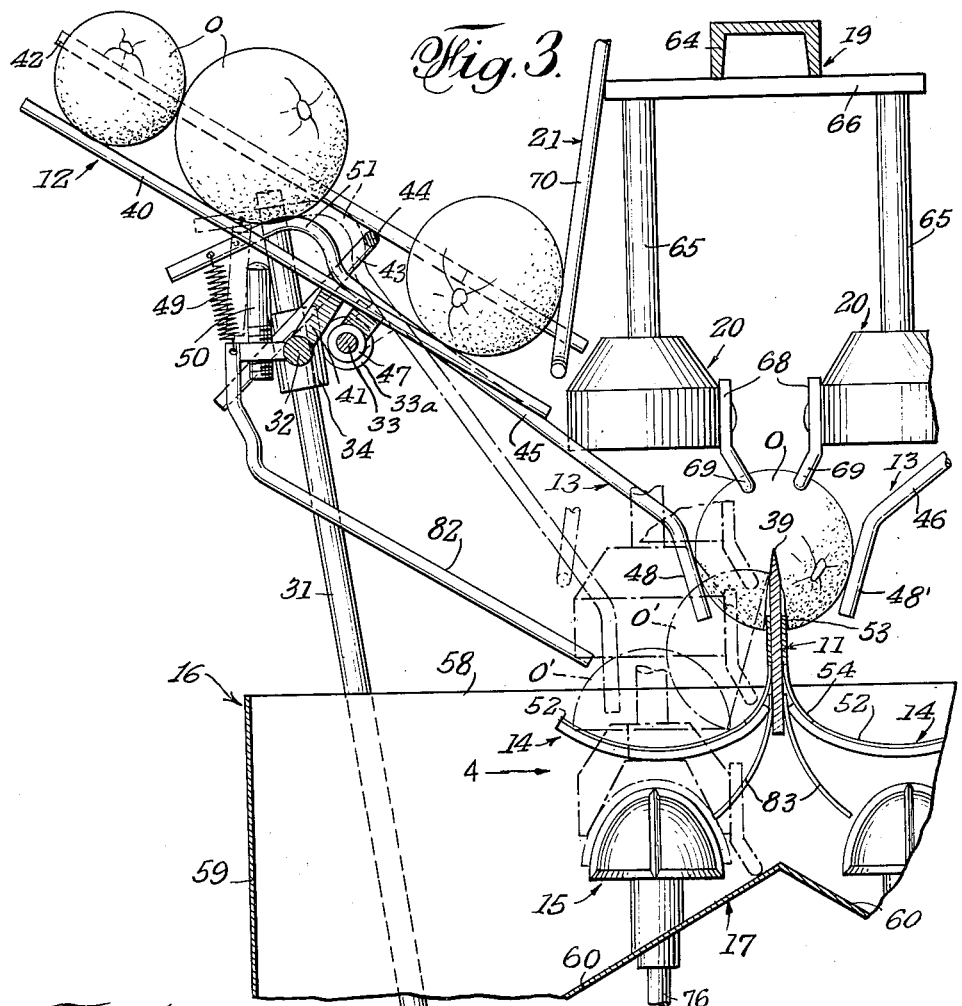
Fig. 3 is a vertical sectional view as taken on line 3—3 of Fig. 2.
Figure 4:
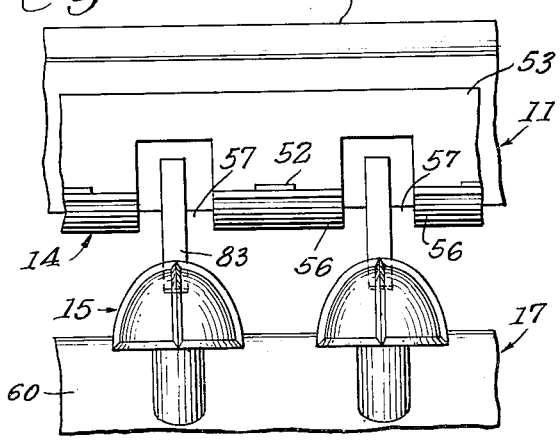
Fig. 4 is a fragmentary side elevational view as seen in the direction of the arrow 4 of Fig. 3.

The blade 11 has a sharp edge 39 that is directed upwardly and is adapted to divide fruit, such as oranges O, into halves O', as is illustrated in Fig. 3.

The number of fixed feed guides 12 may vary as desired and according to the desired production capacity of the machine. Each of said guides comprises a middle support bar 40 fixedly carried by the longitudinal member 32, as by means of a bracket 41, and a pair of transversely spaced rails 42 above and on either side of bar 40. Said rails are spaced according to the largest orange that may rest upon bar 12 to guide the same in a direction toward the blade 11. Accordingly, said bar and rails are arranged to slope downwardly toward said blade substantially as illustrated in Figs. 1 and 3.

The rails 42 are fixedly carried by a bracket 43 from said member 32, the same being provided wtih a transverse stop rod 44. As seen from Fig. 2, said stop rod may comprise a single rod that is common to all of the feed guides 12. It will be clear that, normally, said rod 44 arrests the movement of oranges in guides 12. Said guides may be as long as is required and the oranges may be fed to said guides from chutes, hoppers (not shown), or other such means.

The resilient means 13 is operatively associated with each feed guide 12 and comprises a pair of guide rods 45 on either side of bar 40 and a somewhat similar pair of rods 46 on the opposite side of the machine. Each said pair of rods 45 and 46 is affixed to a sleeve 47 that is revolubly carried by the member 33 on each side of the machine. Both said pairs of rods are formed with bent ends 48, 48', the same terminating adjacent the opposite sides of the blade 11 and cooperating to form a nest for an orange O released from feed guide 12.

Fig. 1 shows the nest, above described, holding an orange centered above the cutting edge 39 of blade 11.

It will be realized from the foregoing that the rods 45 comprise an extension of the guide 12 and will receive an orange, after the same has been freed from stop rod 44, and will guide the same to the mentioned cutting or dividing position where the cooperating rod ends 48 effect substantially accurate centering of the orange regardless of the size of the latter.

Said pairs of guide rods 45 and 46 are biased by springs 49, 49' against adjustable stops 50 and are adapted to be depressed or swung around the axes of the opposite members 33 so as to spread the rod ends 48 that the latter will effect release of an orange after the same has been halved. However, as seen in Fig. 3, the ends 48 retain orange-nesting relationship while the orange is being cut, although more widely separated than when at initial nesting position.

It is during the mentioned swinging movement of rods 45 that the ends thereof opposite to bent ends 48 are so elevated (see Fig. 3) as to move an orange resting thereon upwardly and, thereby, free it from stop rod 44. To this end, said opposite ends of rods 45 are formed to have curls or humps 51 that effect the mentioned raising or elevating of an orange positioned against stop rod 44.

The orange-half-receiving means 14 is carried by and extends laterally from the sides of blade 11. As may best be seen from Figs. 2 to 7, said means comprises a series of longitudinally spaced metal fingers 52 that are spaced so as to be disposed between and above the reamers 15. Said fingers are relatively narrow and provide spaces therebetween that are large enough to freely pass the largest orange half O' that may be formed by the blade 11.

Said fingers 52 are preferably formed as integral lateral extensions of metal backings 53 that are secured to the opposite sides of the blade 11, and between where the fingers 52 and the backings 53 are joined, there are provided relatively short and curved lateral extensions 54 that are centered between the fingers and are so formed as to define recesses or slots 55. The purpose of said slots will be made apparent later.

It will be evident that orange halves O', as oranges are severed, first have positions with their cut-open faces adjacent the blade 11 and the backings 53. The curved extensions 54, being in the path of downward movement of the orange halves, will laterally deflect the leading portions of said halves to impart a 90° turn thereto. This transition of position of the orange halves is shown in Fig. 3.

Figure 2:
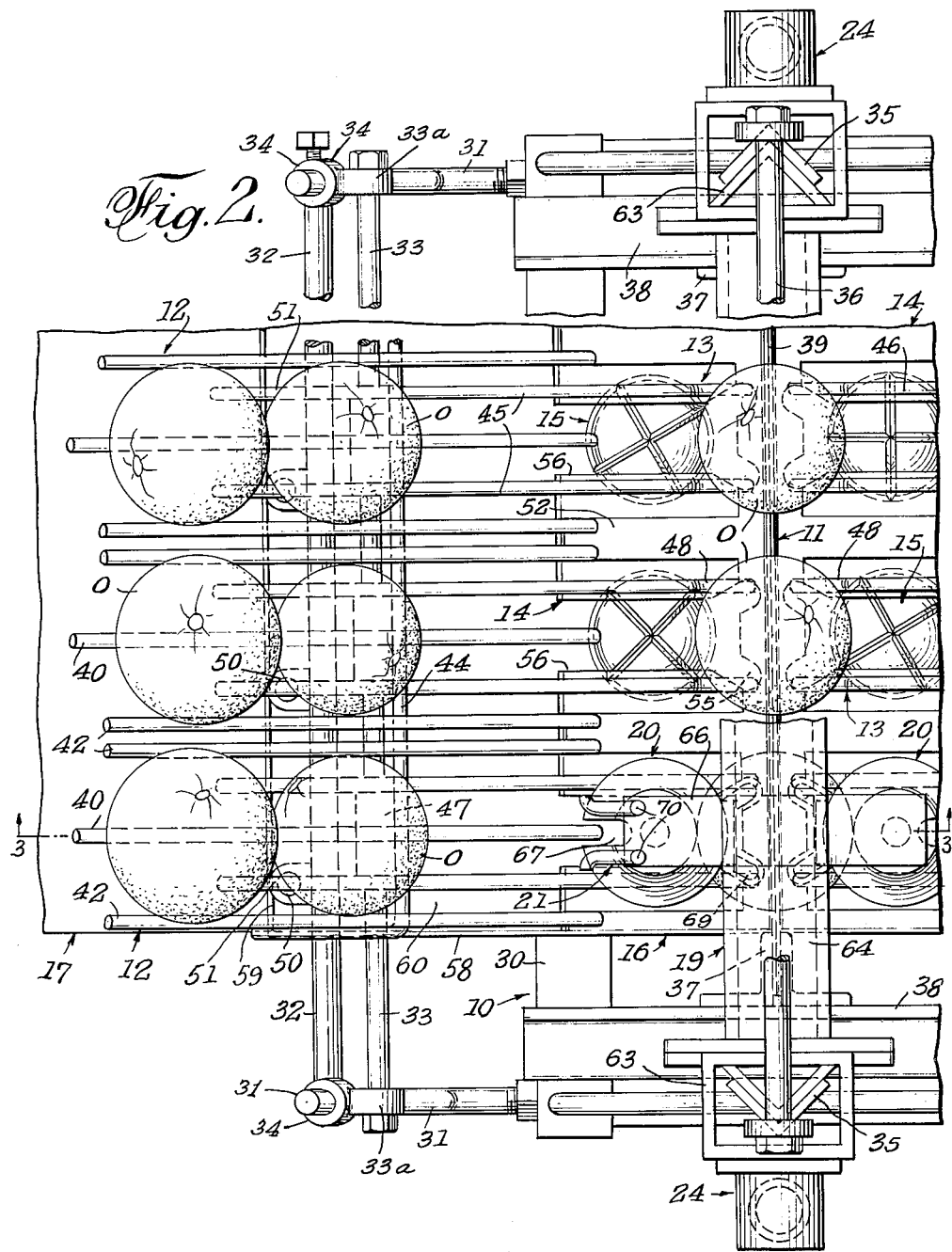
Fig. 2 is an enlarged and broken plan view of a part of the machine shown in Fig. 1.

The orange halves are prevented from falling through the spaces between fingers 52 by flexible ledge portions 56 that are affixed to said fingers and extend partly across the spaces therebetween, as best seen in Figs. 2, 5 and 6. The spaces 57 between said ledge portions are small enough to prevent the smallest orange half from falling through onto the reamers therebeneath. Said ledge portions 56 are advantageously made of thin, flexible material, such as synthetic rubber. The same are given form-retaining shape by forming the fingers 52 on a curve (Fig. 3), said ledge conforming to the curvature and constituting firm, yet readily deflected, orange-half supports. As seen in Figs. 3 and 6, said ledges effectively support both large and small orange halves.

It will be clear that the ledges 56 and the spaces 57 formed thereby are aligned with the guides 12 and the means 13 to insure proper feeding of orange-halves to positions aligned above the reamers 15.

The reamers 15 are of generally conventional design and are so spaced beneath the flexible support ledges 56 that the latter, when deflected to allow passage of an orange-half, will swing clear of the reamers so as not to be injured thereby. Fig. 7 shows this relationship.

The housing 16 is preferably of rectangular form, being provided with end splash walls 58 and side splash walls 59, the same intercepting any spray from the oranges while the latter are being reamed.

The juice-draining pan 17 is formed to have oppositely and laterally sloping walls 60 that abe beneath the reamers 15, the same being coincident with the areal size of housing 16 and being provided with lateral extensions 61 beyond housing walls 58 and 59.

The juice traps 18 are formed as troughs that are arranged on a draining slope to conduct the juice to a point of storage or to conduits in a processing system. In any case, the juice produced by the reamers 15 drains from the machine from both sides thereof, as shown in the drawings. A single drain may be provided by using but one sloping wall 60 but placing the two rows of reamers to one side of the high point of said wall.

By placing a suitable screen across the top of each trough or trap 18 or, as shown, providing a series of transverse rods or wires 62 thereacross, the reamed peels or skins of the orange halves are kept from entering said traps but rather are directed to fall outward from the sides thereof.

The cross head 19 is slidably carried by the vertical guides 35 and is formed to comprise slides 63 engaged with said guides, and a longitudinal member 64 that connects said slides and is disposed in alignment above the blade 11.

The orange-half-engaging cups 20 are rigidly carried by the member 64 of the cross head as by stems 65 and transverse plates 66 affixed to said member and said stems. The cups are aligned with the reamers 15 and move toward and from the reamers upon reciprocation of the cross head. As may best be seen in Figs. 6, 7 and 8, each cup is formed to be interiorly hollow so as to engage over and frictionally grip an orange half and, as shown in Figs. 2 and 8, each said cup is provided with a vertical slot 67 on the side thereof away from the blade 11.

As shown best in Figs. 3 and 5, each cup 20, on the side thereof opposite to slot 67, is provided with an orange-engaging member 68 that, in this instance, is shown as a pair of downwardly directed and divergent fingers 69 that are designed to press an orange against the cutting edge 39 to cut said orange in two when the cross head 19 moves downwardly. The mentioned recesses 55 (see Fig. 5) allow said fingers 69 to pass downwardly below the means 14, as can be seen from the lowermost dot-dash line position of Fig. 3.

The means 21 is here shown as a pair of rods 70 carried by the cross head, as by securement to plate 66, and in front of each cup 20 on the side of the feed guides 12. Said rods move with cups 20 and assume a position across the discharge ends of rails 42 to intercept oranges elevated by humps 51 to roll past the top rod 44. Thus, oranges may not reach the means 13 until same has been released to resume their initial orange-supporting position, as in Fig. 1.

The prime mover 22 is shown as an electric motor 71 that is carried by the frame support 30 and is provided with a high-speed output shaft 72 and a reducing gear 73 that terminates in a low-speed output shaft 74. Said motor is disposed in out-of-the-way position beneath the drain pan 17.

The drive 23 between the reamers 15 and the motor shaft 72 may advantageously comprise a pulley 75 on said shaft, a shaft 76 mounting each reamer, a pulley 77 on each shaft 76, and a belt, chain or other common connector 78 trained around said pulleys 75 and 77 to impart the high speed of pulley 75 to the reamers.

The means 24 to reciprocate the cross head 19 is here shown as a shaft 79 disposed longitudinally of the machine below the pan 17, a crank 80 on each end of said shaft, and a pitman 81 connecting each said crank and the cross head 19. It will be clear that the throw of the cranks 80 is such as to move the cross head and, therefore, the cups 20 between an elevated position of the latter above the path of feed of oranges and a position of the cups in which they press an orange half against the top of the spinning reamers 15.

The slow-speed drive 25 is shown as a chain and sprocket connection between shafts 74 and 79.

It is believed that the operation of the machine will be clear from the foregoing, and that with each stroke of the cross head, an orange from each guide 12 is released during the down stroke of the cross head to first fall against the intercepting rods 70 and then upon the up stroke of the cross head, into position above the cutting edge 39 supported by the nest formed by rod ends 48. Upon the next down stroke of the cross head, as each guide 12 releases a second orange from stop 44, the fingers 69 press upon the oranges above the blade to divide said oranges into substantially equal halves, as hereinabove described.

Since the down stroke of the cross head is a continuous one, the orange halves, with a continuous movement, are moved into support position onto the ledge portions 56 where they are beneath and in alignment with the respective cups 20. The continuous movement progresses to cause the cups to push against the orange halves, deflect the ledge portions 56 out of the path of such movement and, finally, press the cut faces of the orange halves against the reamers 15.

It will be noted that the movement of the cross head downward is first relatively slow during orange-cutting, then relatively faster during transition movement of the divided orange halves from a position with their cut faces at the side and said faces directed toward the reamers, and finally, relatively slower during reaming of the orange halves. In this case, the characteristics of movement of cranks 80 provide such continuous, non-uniform, movement of the cross head and the parts carried thereby, so that the working portions of the down stroke are not only slower but also utilize the more powerful portions of the crank movement.

Upon the up, or recovery, stroke of the cross head, the reamed-out orange peels will ordinarily come away with the cups 20. As shown in Fig. 8, said peels may be dislodged from the cups by fingers 82 that are aligned with and enter into slots 67 as the cups are moved upwardly. In the event of such peels falling onto the means 14, the next orange halves moved by fingers 69 will dislodge the same onto the draining tray 17 from which they will slide off the rods 62, as above indicated. Said rods 62 are provided on both sides of the machine and may be fixedly carried by vertical member 31 by means of suitable bracket members (not shown).

In the event that the reamed-out peels remain with the reamers, the same will be dislodged upon upward movement of the cups 20. The means provided for this purpose simply comprises resilient tongues 83 that are carried by the blade 11 and are biased in a direction toward the respective reamers. As the cups 20 move down, they deflect said fingers, which remain deflected until the cups are withdrawn upwardly. Upon release, the free end of a finger that finds a peel on a reamer will engage said peel. Now, due to the high-speed rotation of the reamers, a peel thus engaged will become dislodged and fall onto tray 17.

Since the cups 20 and reamers 15 are now cleared of reamed-out peels, the succeeding cycle of operation may take place without interference. Thus, so long as oranges are fed to each guide 12 of the machine, each stroke of the cross head will ream out the pulp and juice of the oranges thus fed and the operation will be unaffected by substantial changes in orange size, as above indicated.

While the foregoing has illustrated and described what is now contemplated to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. A citrus fruit juicer comprising the combination of a frame, an elongated stationary blade mounted on the frame, said blade having an upper cutting edge, means adjacent said blade to feed citrus fruit to a position above and generally centered with respect to said cutting edge, said means being operably connected to the frame, reamers disposed on said frame on each side of the blade and mounted to rotate on substantially vertical axes, pushing means on either side of the said blade having a first portion thereon operable to push on the fruit above the cutting edge to move the same downwardly to be divided into halves by said blade edge, and having a second portion thereon engageable with said halves to move said halves toward the reamers, means on either side of said blade and in the path of movement of the fruit halves while the halves are moved by said pushing means to turn the halves from dispositions with their cut faces directed toward the blade to dispositions with said faces directed toward the reamers, said turning means being operably connected to said frame, and flexible support means for the fruit halves mounted on said frame in said path and deflected by the halves during movement of the latter to operative engagement with the reamers.

2. A citrus fruit juicer according to claim 1 including means on the frame whereby the fruit-feeding means is intermittently controlled by the fruit-pushing means.

3. A citrus fruit juicer according to claim 1 in which a drive is provided for moving said fruit-pushing means alternately downwardly and upwardly and in which the feed of fruit is initiated during the downward stroke and completed during the upward stroke of the pushing means.

4. In a citrus fruit juicer, the combination of a frame, a fixed blade mounted on said frame, said blade having an elongated cutting edge, reamers mounted for rotation on said frame to receive the halves when moved past the mentioned supporting means, pushing means on either side of the said blade having a first portion thereon operable to push on the fruit above the cutting edge to move the same downwardly to be divided into halves by said blade edge, and having a second portion thereon engageable with said halves to move said halves toward the reamers, means on either side of said blade in the path of movement of the fruit halves while being moved by said above mentioned means to turn the same from positions on each side of the blade and with the opposite cut faces of the halves facing the blade to positions with said cut faces facing in the same direction, and resilient means on said frame temporarily supporting the fruit halves while in the latter position.

5. In a citrus fruit juicer according to claim 4, the fruit-moving means comprising a continuously reciprocating member that terminates its movement in one direction when the fruit is in reaming position on the reamers.

6. In a citrus fruit juicer having a frame and a pair of reamers, pushing means on said frame to move the halves of divided fruit from positions with the cut faces directed toward each other to positions with said faces facing in the same direction and in alignment above said reamers, and deflectable means on said frame between the fruit halves in the latter position and the reamers, said deflectable means comprising resilient ledge portions supported on said frame above the reamers, and means on said frame to push the fruit halves past the deflectable means into the reamers.

7. The combination with a citrus fruit juicer according to claim 1 of means on said frame to move the fruit-pushing means in an opposite recovery direction, and means on said frame operative during the latter movement to dislodge reamed-out fruit halves from the pushing means.

8. The combination with a citrus fruit juicer according to claim 1 of means on said frame to move the fruit-pushing means in an opposite recovery direction, and means on said frame operative during the latter movement to dislodge reamed-out fruit halves from the reamers.

9. A citrus fruit juicer comprising a frame mounting a fixed blade having a cutting edge, a reciprocating cross head on said frame movable toward and from said blade edge, two parallel rows of reamers mounted on the frame, one row on each side of the blade, means on said frame to feed citrus fruit to positions aligned above the blade edge and substantially centrally of said edge, pushing means on either side of the said blade having a first portion thereon operable to push on the fruit above the cutting edge to move the same downwardly to be divided into halves by said blade edge, and having a second portion thereon engageable with said halves to move said halves toward the reamers and resilient means on said frame in the path of movement of the fruit halves to receive said halves with their cut faces directed toward the reamers and to deflect from the path of movement of the halves toward operative engagement with the reamers during the remainder of said one stroke of the cross head.

10. A citrus fruit juicer comprising the combination of a frame, an elongated stationary blade on said frame, said blade having an upper cutting edge, means on said frame to feed citrus fruit to a position above and generally centered with respect to said cutting edge, reamers disposed on each side of the blade and mounted to rotate on substantially vertical axes, pushing means on either side of the said blade having a first portion thereon operable to push on the fruit above the cutting edge to move the same downwardly to be divided into halves by said blade edge, and having a second portion thereon engageable with said halves to move said halves toward the reamers, means on said frame in the path of movement of the fruit halves to turn the halves from dispositions with their cut faces directed toward the blade to dispositions with said faces directed toward the reamers, and flexible support means on said frame for the fruit halves in said path and deflected by the halves during movement of the latter to operative engagement with the reamers, and means on said frame to clear the reamers and fruit-pushing means of reamed-out fruit halves following the reaming operation.

11. A citrus fruit juicer according to claim 10, including means on said frame whereby the fruit-feeding means is controlled by the cross head-carried members.

12. A citrus fruit juicer comprising the combination of a frame, an elongated stationary blade on said frame, said blade having an upper cutting edge, means on said frame to feed citrus fruit to a position above and generally centered with respect to said cutting edge, reamers disposed on each side of the blade and mounted to rotate on substantially vertical axes, pushing means on either side of the said blade having a first portion thereon operable to push on the fruit above the cutting edge to move the same downwardly to be divided into halves by said blade edge, and having a second portion thereon engageable with said halves to move said halves toward the reamers, and means on said frame in the path of movement of the fruit halves to turn the halves from dispositions with their cut faces directed toward the blade to dispositions with said faces directed toward the reamers.

13. A citrus fruit juicer according to claim 1 wherein said turning means comprises curved extensions leading from the lower portion of said blade to positions directly above said reamers, and including means on the frame whereby the fruit feeding means is intermittently controlled by the fruit pushing means.
omember 14. In a citrus fruit juicer, the combination of a frame, a fixed blade mounted on said frame, said blade having an elongated cutting edge, reamers mounted for rotation on said frame, pushing means on either side of the said blade having a first portion thereon operable to push on the fruit above the cutting edge to move the same downwardly to be divided into halves by said blade edge, and having a second portion thereon engageable with said halves to move said halves toward the reamers, means on either side of said blade in the path of movement of the fruit halves while being moved by said above mentioned means to turn the same from positions on each side of the blade and with the opposite cut faces of the halves facing the blade to positions with said cut faces facing in the same direction.

References Cited in the file of this patent
UNITED STATES PATENTS

| | | |
|---|---|---|
| 2,065,271 | Faulds | Dec. 22, 1936 |
| 2,367,859 | Fromm | Jan. 23, 1945 |
| 2,737,989 | Wurgaft | Mar. 13, 1956 |